(12) United States Patent
Zhong

(10) Patent No.: US 12,208,831 B2
(45) Date of Patent: Jan. 28, 2025

(54) STROLLER FRAME

(71) Applicant: WONDERLAND SWITZERLAND AG, Steinhausen (CH)

(72) Inventor: Zhiren Zhong, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 430 days.

(21) Appl. No.: 17/528,938

(22) Filed: Nov. 17, 2021

(65) Prior Publication Data

US 2022/0153331 A1    May 19, 2022

(30) Foreign Application Priority Data

Nov. 18, 2020    (CN) .......................... 202011297724.9

(51) Int. Cl.
*B62B 7/06* (2006.01)

(52) U.S. Cl.
CPC ............ *B62B 7/06* (2013.01); *B62B 2205/20* (2013.01)

(58) Field of Classification Search
CPC ........... B62B 7/06; B62B 7/083; B62B 7/105; B62B 7/10; B62B 9/20; B62B 9/12; B62B 2205/20; B62B 2206/06; B62B 2301/0463; B62B 3/007; B62B 3/02; B62B 3/022

See application file for complete search history.

(56) References Cited

U.S. PATENT DOCUMENTS

| | | | |
|---|---|---|---|
| 10,913,478 B1 * | 2/2021 | Zhou | B62B 7/105 |
| 11,091,183 B2 * | 8/2021 | Wu | B62B 3/007 |

| | | | |
|---|---|---|---|
| 2011/0285110 A1 | 11/2011 | Xu-Hui et al. | |
| 2014/0183843 A1 | 7/2014 | Iftinca et al. | |
| 2015/0274188 A1 | 10/2015 | Li | |

FOREIGN PATENT DOCUMENTS

| | | | | |
|---|---|---|---|---|
| CN | 101573265 A | * | 11/2009 | ............... B62B 7/08 |
| CN | 201646791 U | | 11/2010 | |
| CN | 202345741 U | | 7/2012 | |

(Continued)

OTHER PUBLICATIONS

Taiwan Office Action issued in corresponding Taiwan Application No. 110142833, dated Jan. 30, 2023.

(Continued)

*Primary Examiner* — Steve Clemmons

(74) *Attorney, Agent, or Firm* — HAUPTMAN HAM, LLP

(57) ABSTRACT

The present application discloses a stroller frame switchable between an unfolded position and a folded position. The stroller frame includes an unfolding and folding mechanism, a front foot support, a rear foot support, a first connecting bar, and a second connecting bar. The unfolding and folding mechanism includes a supporting body and a movable body movable relative to the supporting body. The front foot support is pivotally connected to the supporting body. The rear foot support is pivotally connected to the supporting body, the rear foot support is pivotable relative to the front foot support. The first connecting bar is pivotally connected to the front foot support and the movable body, respectively. The second connecting bar is pivotally connected to the rear foot support and the movable body, respectively, and the second connecting bar is pivotable relative to the first connecting bar.

20 Claims, 15 Drawing Sheets

(56) References Cited

FOREIGN PATENT DOCUMENTS

| | | | |
|---|---|---|---|
| CN | 205854245 U | | 1/2017 |
| CN | 107226121 A | | 10/2017 |
| CN | 107554593 A | * | 1/2018 |
| CN | 207328550 U | | 5/2018 |
| CN | 110588758 A | | 12/2019 |
| CN | 110979438 A | * | 4/2020 |
| CN | 111409686 A | | 7/2020 |
| KR | 20150029659 A | | 3/2015 |
| TW | M487240 U | | 10/2014 |

OTHER PUBLICATIONS

Chinese First Office Action issued in corresponding Chinese Application No. 202011297724.9, dated Dec. 15, 2023, pp. 1-26.

* cited by examiner

STROLLER FRAME

CROSS-REFERENCE TO RELATED APPLICATIONS

This application claims the priority of Chinese Patent Application No. 202011297724.9, filed on Nov. 18, 2020, and entitled "STROLLER FRAME", the disclosure of which is incorporated herein by reference in its entirety.

TECHNICAL FIELD

The present disclosure relates to a stroller, in particular to a stroller frame, which is convenient to unfold and fold, and occupies small space after being folded.

BACKGROUND

With continuous progress of society, continuous development of economy, and continuous improvement of science and technology, more and more consumption goods are supplied to people, thereby creating extremely excellent material conditions for improving living standards of people. The stroller is one of the consumption goods.

As we all know, baby strollers are a kind of strollers. In order to make the baby strollers adapted for young children of different ages, the requirements for the baby strollers are different. For example, the baby stroller provided with a carry cot is applicable for younger children with small ages, so it mainly provides functions for lying and sleeping.

However, in the baby stroller provided with the carry cot, the design of the assembly structure for the carry cot and the frame is unreasonable, which makes the unfolding or folding operation for the stroller frame inconvenient, and the space occupied by the folded stroller is relatively large.

Therefore, it is urgent to provide a stroller frame that is convenient to unfold or fold and occupies small space after being folded, to overcome the above-mentioned defects.

SUMMARY

The objective of the present disclosure is to provide a stroller frame, which is convenient to unfold or fold, and occupies small space after being folded.

In order to achieve the above objective, the present disclosure provides a stroller frame, switchable between an unfolded position and a folded position, and including: an unfolding and folding mechanism, including a supporting body and a movable body movable relative to the supporting body; a front foot support, pivotally connected to the supporting body; a rear foot support, pivotally connected to the supporting body, the rear foot support is pivotable relative to the front foot support; a first connecting bar, pivotally connected to the front foot support and the movable body, respectively; a second connecting bar, pivotally connected to the rear foot support and the movable body, respectively, the second connecting bar is pivotable relative to the first connecting bar.

In some embodiments, the movable body is arranged in the supporting body and slidable in up and down directions.

In some embodiments, the front foot support, the rear foot support and the supporting body are pivotally and coaxially connected; and the movable body, the first connecting bar and the second connecting bar are pivotally and coaxially connected.

In some embodiments, the unfolding and folding mechanism further comprises a locking member movably assembled in one of the supporting body and the movable body; another of the supporting body and the movable body is provided with an engaging part for engaging with the locking member; and the locking member is configured to stop the movable body from moving relative to the supporting body when engaging with the engaging part.

In some embodiments, a plurality of engaging parts are provided; the plurality of engaging parts are arranged at intervals in up and down directions.

In some embodiments, the engaging part is a hole or a groove.

In some embodiments, the unfolding and folding mechanism further comprises a releasing member linked with the locking member; the releasing member is configured to disengage the locking member from the engaging part, so that the movable body is movable relative to the supporting body.

In some embodiments, the releasing member is assembled on the supporting body or the movable body where the locking member is assembled, and is slidable in up and down directions; the releasing member further has a driving slope inclined relative to up and down movement directions of the releasing member; and the releasing member is configured to drive the locking member to disengage from the engaging part by means of the driving slope.

In some embodiments, the releasing member is provided with a first slot opening inclined relative to the up and down movement directions of the releasing member; the locking member is arranged to be inserted into the first slot opening; and a side wall of the first slot opening forms the driving slope.

In some embodiments, a guiding groove is disposed on the supporting body or the movable body where the locking member is assembled, and the guiding groove is configured to guide the locking member when the locking member is driven by the releasing member to disengage from the engaging part; and the locking member is configured to be inserted into the guiding groove.

In some embodiments, the unfolding and folding mechanism further comprises an elastic resetting and releasing member; the elastic resetting member is arranged inside the movable body or the supporting body; and the elastic resetting member intends to force the releasing member to drive the locking member and the engaging part to engage with each other.

In some embodiments, the movable body comprises an elastic damping member, an upper movable body, and a lower movable body; the upper movable body and the lower movable body are telescopic relative to each other and slidable in up and down directions; the lower movable body is pivotally connected to the first connecting bar and the second connecting bar, respectively; and the elastic damping member is arranged between the upper movable body and the lower movable body.

In some embodiments, the stroller frame further includes a playpen support assembled on the supporting body.

In some embodiments, wherein the playpen support is in a shape of a ring.

In some embodiments, the stroller frame further includes a handle. The handle is pivotally connected to the rear foot support or the front foot support, and configured to be switchable between a position of pushing the stroller and a position of pulling the stroller.

In some embodiments, the stroller frame further includes a wheel orientation mechanism linked with the handle. The front foot support and the rear foot support each are provided with a wheel; the wheel orientation mechanism is assembled on the rear foot support or the front foot support; when the handle is switched to the position of pushing the stroller, the handle is configured to drive the wheel orientation mechanism to lock the wheel arranged to the front foot support or the rear foot support; and when the handle is switched to the position of pulling the stroller, the handle is configured to drive the wheel orientation mechanism to release the wheel arranged to the front foot support or the rear foot support.

In some embodiments, the wheel orientation mechanism comprises a flexible traction member, an orientation member and an orientation elastic resetting member; the traction member is arranged inside the handle, and inside the front foot support or the rear foot support; a first end of the traction member is assembled on the handle, and a second end of the traction member is assembled on the orientation member; the orientation member is movably assembled on the front foot support or the rear foot support; the orientation elastic resetting member is arranged on the orientation member, and inside the front foot support or the rear foot support; the orientation elastic resetting member intends to drive the orientation member to move to engage with the wheel, arranged on the front foot support or the rear foot support; when switching the handle to the position of pulling the stroller, the orientation member is lifted to release the wheel by the traction member; when switching the handle to the position of pushing the stroller, the orientation member is lowered to lock the wheel by the traction member.

In some embodiments, the handle has a cam-profiled structure; a part of the traction member between a first end and a second end of the traction member is arranged around the cam-profiled structure; when switching the handle between the position of pushing the stroller and the position of pulling the stroller, the cam-profiled structure is configured to correspondingly lower or lift the orientation member.

In some embodiments, the stroller frame further includes a tubular member pivotally connected to the handle, and a suspension mechanism configured to keep the handle at the position of pushing the stroller or at the position of pulling the stroller. The suspension mechanism is assembled on the handle, and to the front foot support or the rear foot support.

In some embodiments, the suspension mechanism includes: a sliding member, slidably arranged on the tubular member, and a locked member, arranged on the front foot support or the rear foot support; the sliding member is provided with a second slot opening extending along a sliding direction of the sliding member, a first locking part and a second locking part which are in communication with the second slot opening; the locked member is arranged to be inserted into the second slot opening; when switching the stroller frame between the unfolded position and the folded position, the locked member is configured to slide along the second slot opening; the locked member is configured to slide into the first locking part when the handle is in the position of pushing the stroller; and the locked member is configured to slide into the second locking part when the handle is in the position of pulling the stroller.

In some embodiments, the first locking part and the second locking part each are a notch opening to the second slot opening.

In some embodiments, the suspension mechanism further includes an elastic retainer arranged between the sliding member and the tubular member; the elastic retainer intends to drive the sliding member to slide along a length direction of the tubular member, to force the locked member to engage with the first locking part or the second locking part.

In some embodiments, the stroller frame further includes a third connecting bar, a fourth connecting bar, a front intermediate connecting bar, and a rear intermediate connecting bar. The third connecting bar, the fourth connecting bar, the front foot support, the rear foot support, the unfolding and folding mechanism, the first connecting bar, and the second connecting bar each are arranged at a left side and at a right side of the stroller frame; the front foot support comprises a front straight leg and a front bent leg pivotally connected to the front straight leg; the rear foot support comprises a rear straight leg and a rear bent leg pivotally connected to the rear straight leg; the supporting body is pivotally connected to the front straight foot and the rear straight leg, respectively; left and right ends of the front intermediate connecting bar each are assembled and connected to a corresponding front bent leg disposed at the same end; left and right ends of the rear intermediate connecting bar each are assembled and connected to a corresponding rear bent leg disposed at the same end; the third connecting bar is pivotally connected to the movable body and the front bent leg at the same side, respectively; and the fourth connecting bar is pivotally connected to the movable body and the rear bent leg at the same side, respectively.

Compared with the prior art, the unfolding and folding mechanism includes the supporting body, and the movable body movably relative to the supporting body. The front foot support is pivotally connected to the supporting body, and the rear foot support is pivotally connected to the supporting body. The rear foot support and the front foot support may pivot therebetween, the first connecting bar is pivotally connected to the front foot support and the movable body respectively, and the second connecting bar is pivotally connected to the rear foot support and the movable body respectively, and the second connecting bar and the first connecting bar may pivot therebetween. Therefore, when switching the stroller frame from the unfolded position to the folded position, and while the front foot support and the rear foot support are pivoting therebetween, they drive the first connecting bar and the second connecting bar to pivot along with the movable body moving relative to the supporting body, thereby realizing the folding of the stroller frame, and facilitating the unfolding and folding operations of the stroller frame of the present disclosure, and making the space occupied by the folded stroller frame small.

DETAILED DESCRIPTION OF EMBODIMENTS

The embodiments of the present disclosure will be described herein with reference to the accompanying drawings, and similar element numerals in the accompanying drawings represent similar elements.

Figure 3:
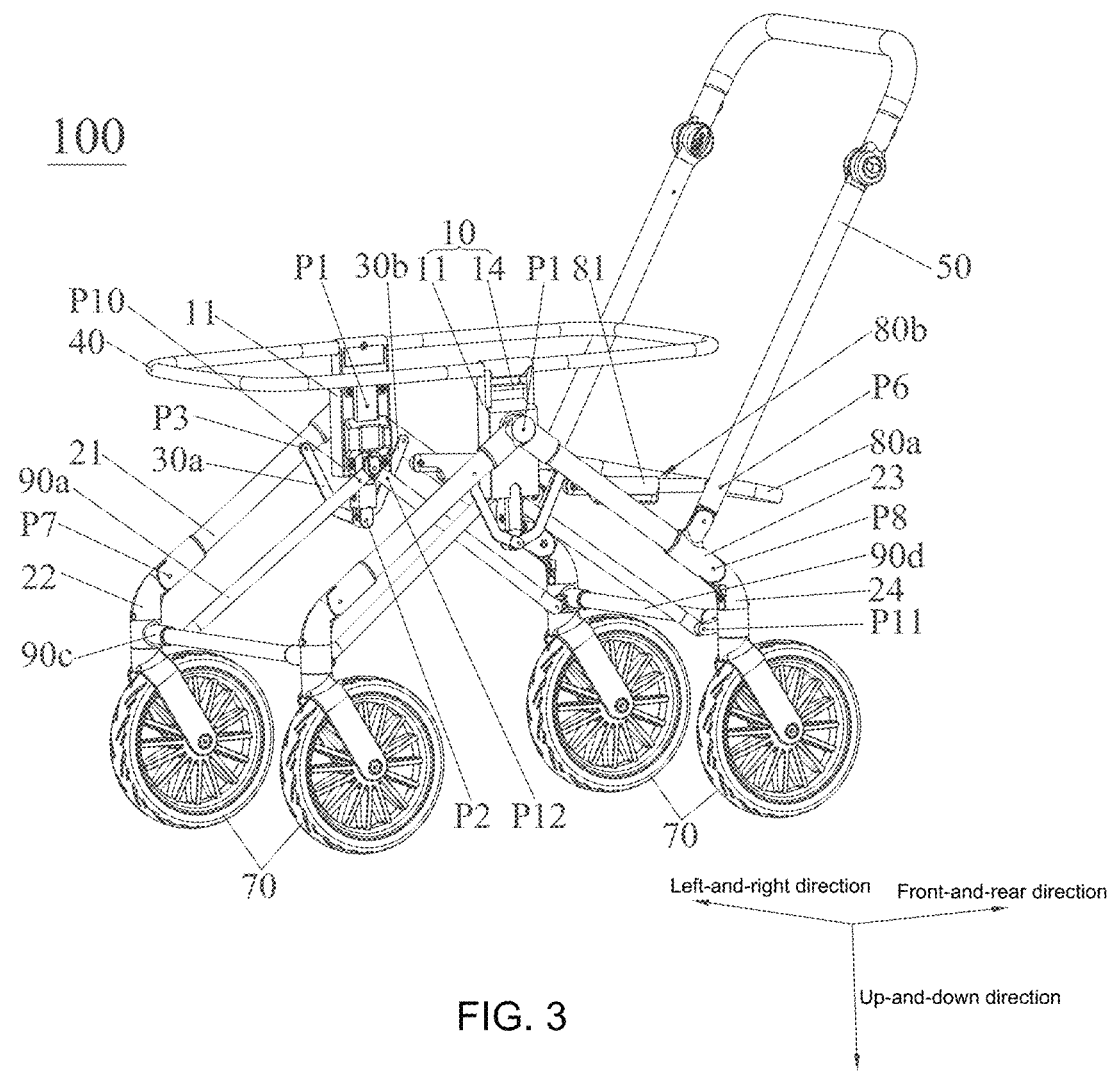
FIG. 3 is a schematic three-dimensional structural view showing the stroller frame in the unfolded position, the handle in the position of pushing the stroller, and a playpen support in a highest position according to the present disclosure.
Figure 4:
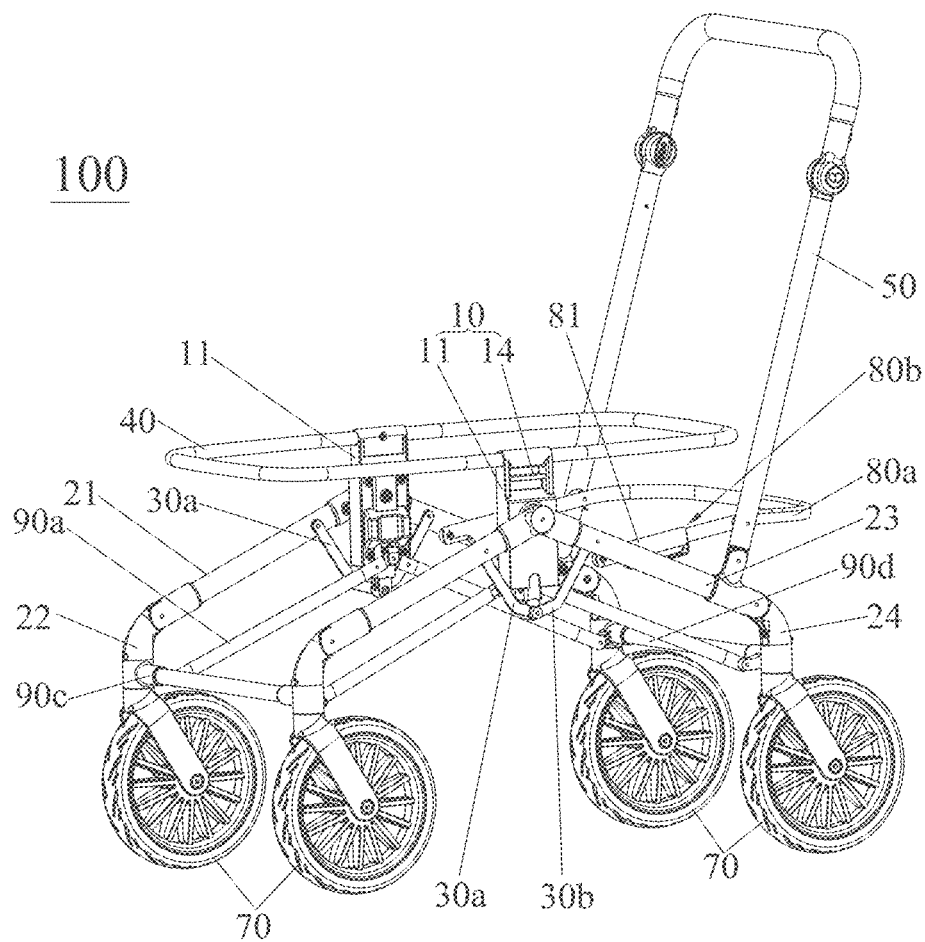
FIG. 4 is a schematic three-dimensional structural view showing the stroller frame shown in FIG. 3 after the playpen support is adjusted downward.
Figure 5:
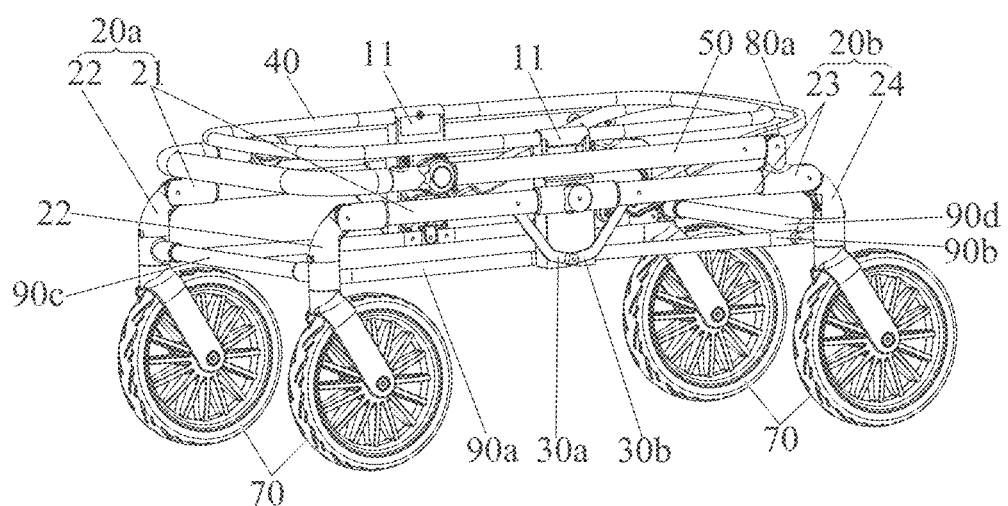
FIG. 5 is a schematic three-dimensional structural view showing the stroller frame in the folded position according to the present disclosure.
Figure 6:
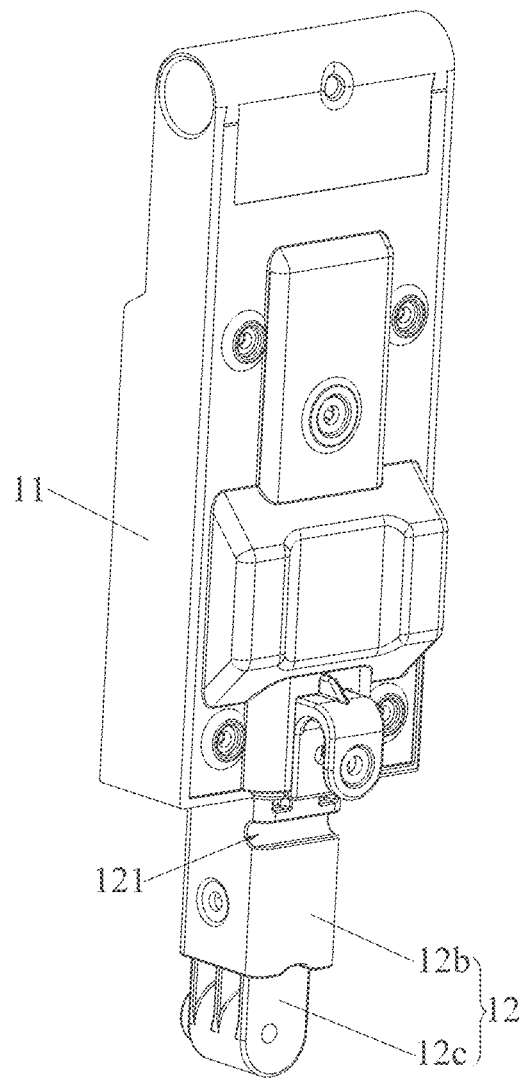
FIG. 6 is a schematic three-dimensional structural view of an unfolding and folding mechanism of the stroller frame according to the present disclosure.

Please refer to FIGS. 1 to 5, the stroller frame 100 of the present application may be switched between an unfolded position shown in FIG. 1, FIG. 2, FIG. 3, or FIG. 4 and a folded position shown in FIG. 5. The stroller frame 100 includes an unfolding and folding mechanism 10, a front foot support 20a, a rear foot support 20b, a first connecting bar 30a, a second connecting bar 30b and a playpen support 40. The unfolding and folding mechanism 10 includes a supporting body 11, and a movable body 12 that is movable relative to the supporting body 11. In some embodiments, in FIG. 7 and FIG. 9, the supporting body 11 is a hollow plate-like structure. The movable body 12 is, but not limited to, a rod-shaped or block-shaped structure embedded in the supporting body 11, and a lower end of the movable body 12 is exposed out of the supporting body 11. The front foot support 20a is pivotally connected to the supporting body 11, and the rear foot support 20b is pivotally connected to the supporting body 11. In some embodiments, the front foot support 20a, the rear foot support 20b and the supporting body 11 are pivotally and coaxially connected, but are not limited to this, so that a first pivot point P1 is formed at a position where the front foot support 20a, the rear foot support 20b and the supporting body 11 are pivotally connected, thus reducing the pivot points where the supporting body 11 is pivotally connected to the front foot support 20a and the rear foot support 20b respectively. Moreover, the rear foot support 20b and the front foot support 20a may pivot therebetween, such as pivot close to or away from each other, to meet the movement requirements of unfolding or folding the stroller frame 100 of the present application. The first connecting bar 30a is pivotally connected to the front foot support 20a and the movable body 12 respectively, so that a third pivot point P3 is formed at a position where the first connecting bar 30a and the front foot support 20a are pivotally connected. The second connecting bar 30b is pivotally connected to the rear foot support 20b and the movable body 12 respectively, so that a fourth pivot point P4 is formed at a position where the second connecting bar 30b and the rear foot support 20b are pivotally connected. In this case, the first connecting bar 30a, the front foot support 20a, and the rear foot support 20b and the second connecting bar 30b form a planar four-linkage mechanism. Moreover, the second connecting bar 30b and the first connecting bar 30a may pivot therebetween, such as pivot close to or away from each other. In some embodiments, the movable body 12, the first connecting bar 30a and the second connecting bar 30b are coaxially and pivotally connected, but not limited to this, so that a second pivot point P2 is formed at a position where the movable body 12, the first connecting bar 30a and the second connecting bar 30b are pivotally connected, thus reducing the pivot points where the movable body 12 is pivotally connected to the first connecting bar 30a and the second connecting bar 30b respectively. The playpen support 40 is assembled on the supporting body 11, and the supporting body 11 is configured to support and fix the playpen support 40. In some embodiments, the playpen support 40 is in a shape of a ring, which facilitates the assembly connection between the playpen support 40 and fabric, thereby making the playpen support 40 together with the fabric form a structure of a carry cot. It will be understood that the shape of the playpen support 40 is not limited to this and may also be any other shape.

As shown in FIG. 3 and FIG. 5, when switching the stroller frame 100 of the present disclosure from the unfolded position shown in FIG. 3 to the folded position shown in FIG. 5, while the front foot support 20a and the rear foot support 20b are pivoting away from each other, they drive the first connecting bar 30a and the second connecting bar 30b so as to pivot away from each other along with the movable body 12 moving towards the supporting body 11, thereby realizing the folding of the stroller frame 100 of the present disclosure, and the state is shown in FIG. 5. The playpen support 40 moves up and down when the stroller frame 100 of the present disclosure is switched between the unfolded position and the folded position, so that the stroller frame 100 of the present disclosure occupies less space after being folded. For example, in FIG. 3, the front foot support 20a and the rear foot support 20b pivot upwards close to each other, so that the front foot support 20a and the rear foot support 20b are abutted in a straight line when the stroller frame 100 of the present disclosure is in the folded position, and the state is shown in FIG. 5, and the stroller frame 100 of the present disclosure may stand on the ground after being folded. It should be understood that, in other embodiments, when switching the stroller frame 100 of the present disclosure from the folded position to the unfolded position, while the front foot support 20a and the rear foot support 20b are pivoting close to each other, they drive the first connecting bar 30a and the second connecting bar 30b so as to pivot close to each other along with the movable body 12 moving away from the supporting body 11, thereby realizing the unfolding of the stroller frame 100 of the present disclosure. In summary, when switching the stroller frame 100 of the present disclosure between the unfolded position and the folded position, while the front foot frame 20*a* and the rear foot frame 20*b* are pivoting, they drive the first connecting bar 30*a* and the second connecting bar 30*b* so as to pivot along with the movable body 12 moving relative to the supporting body 11, thereby realizing the unfolding or the folding of the stroller frame 100 of the present disclosure. In addition, according to actual requirements, the playpen support 40 may not be provided. More specifically, the solutions are as follows.

As shown in FIGS. 1 to 2 and FIGS. 6 to 9, the movable body 12 is arranged in the supporting body 11 and slidable in the up and down direction, so that the movable body 12 may slide up and down along the supporting body 11, and the movable body 12 may move away from or close to the supporting body 11 when the stroller frame 100 of the present disclosure is switched between the unfolded position and the folded position. It will be understood that, the movable body 12 is not limited to such an arrangement, and in other embodiments, the movable body 12 may be detachably connected to the supporting body 11, so that the movable body 12 approaches the supporting body 11 and engages with the supporting body 11 when the stroller frame 100 of the present disclosure is in the folded position, and the movable body 12 may also move away from the supporting body 11 and is detached from the supporting body 11 when the stroller frame 100 of the present disclosure is in the unfolded position.

Figure 7:
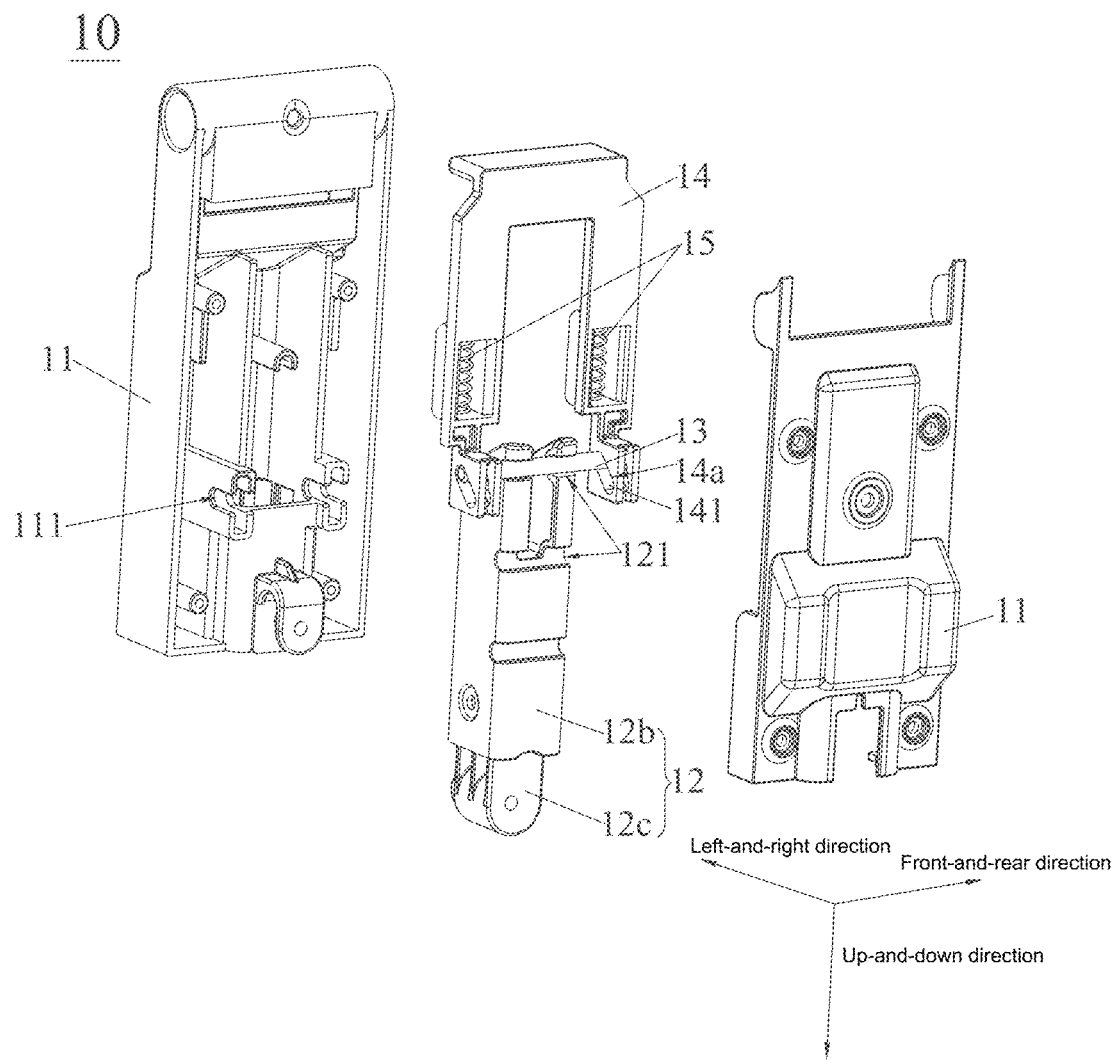
FIG. 7 is a schematic exploded three-dimensional structural view of the unfolding and folding mechanism shown in FIG. 6.
Figure 8:
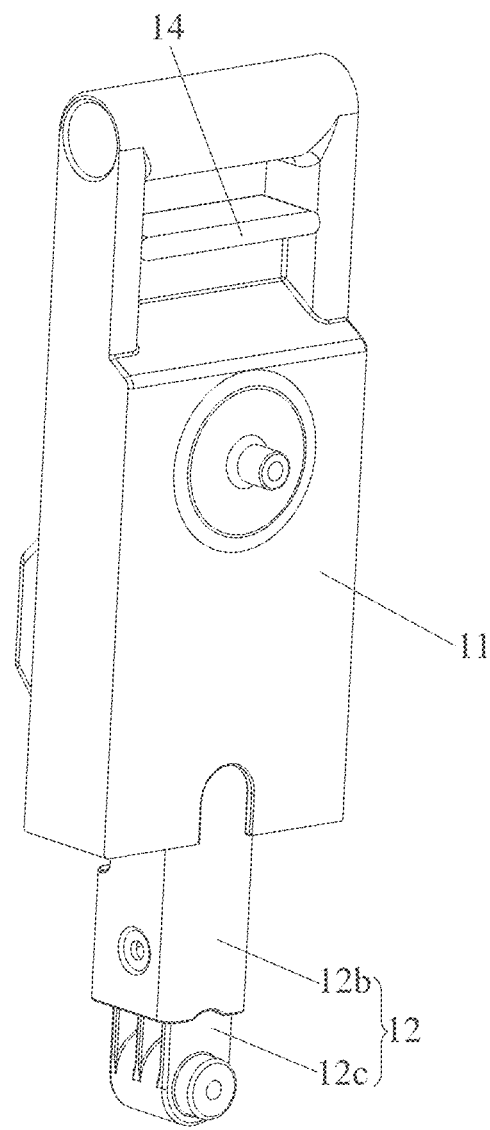
FIG. 8 is a schematic three-dimensional structural view of the unfolding and folding mechanism of the stroller frame from another angle of view according to the present disclosure.
Figure 9:
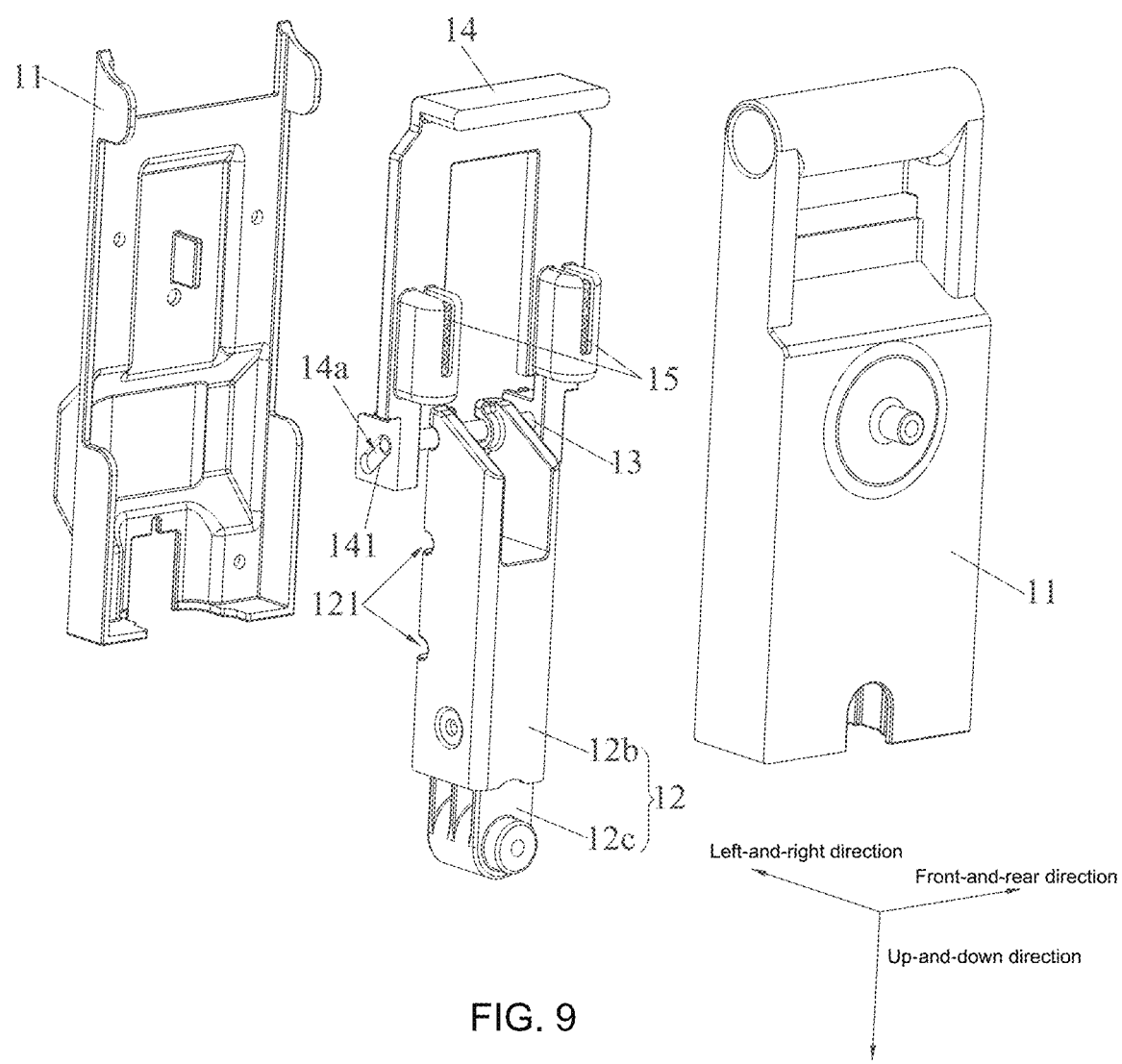
FIG. 9 is a schematic exploded three-dimensional structural view of the unfolding and folding mechanism shown in FIG. 8.
Figure 10:
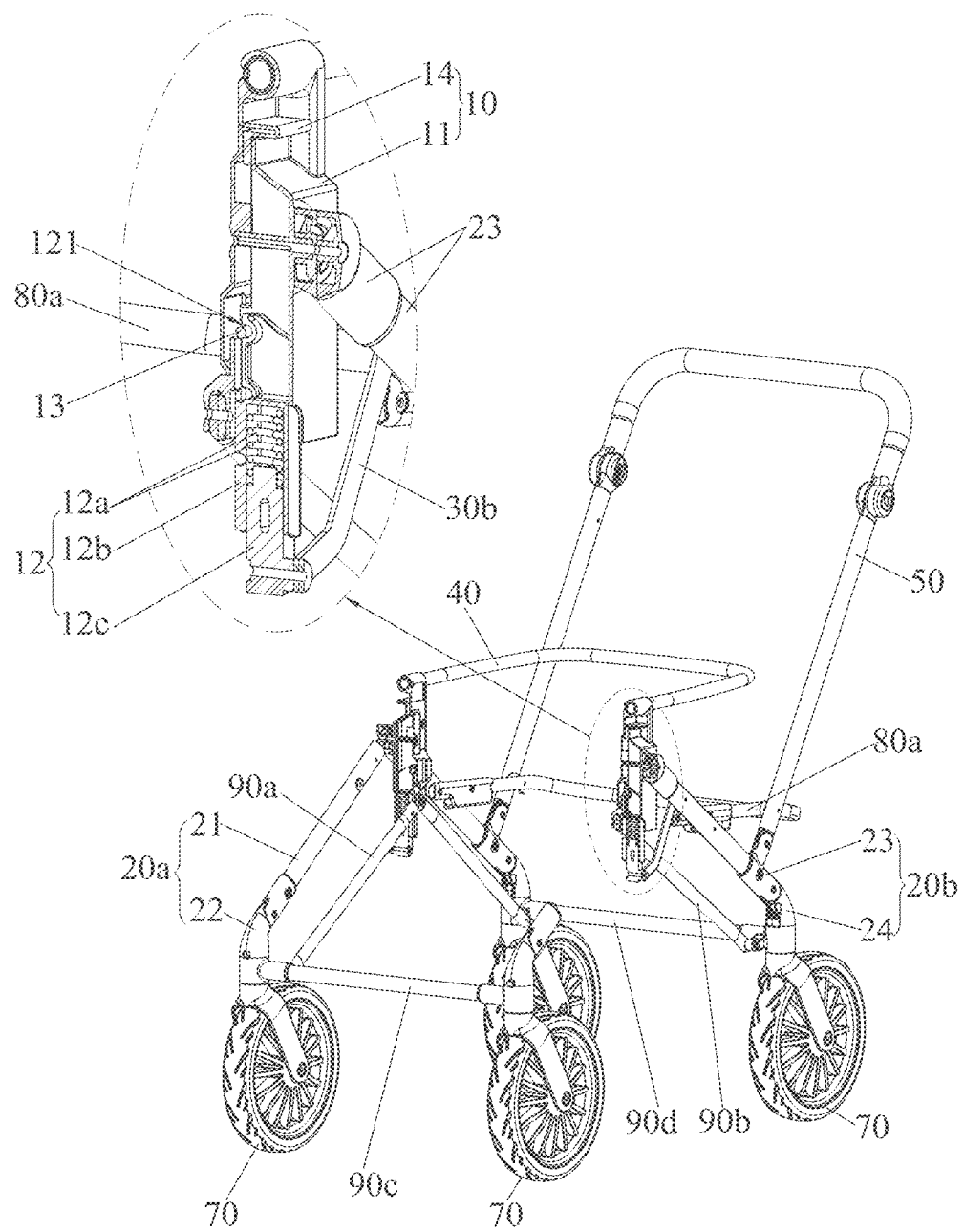
FIG. 10 is a schematic view showing an internal structure of the stroller frame shown in FIG. 3 after the stroller frame is cut by a vertical plane passing through a center of the unfolding and folding mechanism.

As shown in FIGS. 6 to 10, the unfolding and folding mechanism 10 also includes a locking member 13, which is movably assembled in the supporting body 11. In some embodiments, the locking member 13 may be movably assembled in the supporting body 11 and is slidable in the left and right directions of the stroller frame 100 of the present disclosure. It will be understood that, the locking member 13 is not limited to such an arrangement, and it may also be assembled on the supporting body 11 in other ways. The movable body 12 is provided with an engaging part 121 for engaging with the locking member 13. The locking member 13 stops the movable body 12 from moving relative to the supporting body 11 when it is engaged by the engaging part 121. The stroller frame 100 in the unfolded position is prevented from being accidentally folded by means of engaging the locking member 13 with the engaging part 121. Specifically, as shown in FIG. 7, FIG. 9, and FIG. 10, the three engaging parts 121 are provided, and the three engaging parts 121 are arranged at intervals in the up and down directions. The height of the supporting body 11 is adjusted by means of engaging the locking member 13 with different engaging parts 121, thus adjusting the height of the playpen support 40 in the stroller frame 100 in the unfolded position so as to achieve different adjusted heights of the playpen support 40. For example, as shown in FIG. 7, FIG. 9, and FIG. 10, the engaging parts 121 are holes, of course, the engaging parts 121 are selectively configured to be grooves according to actual requirements. The locking member 13 is, but not limited to, a pin shaft. As shown in FIGS. 6 to 10, in order to facilitate the operator's releasing operation on the locking member 13, the unfolding and folding mechanism 10 further includes a releasing member 14 linked with the locking member 13. The releasing member 14 disengages the locking member 13 from the engaging part 121, so that the movable body 12 may move relative to the supporting body 11, thereby allowing the stroller frame 100 in the unfolded position to be switched to the folded position. Specifically, the releasing member 14 is assembled in the supporting body 11 in which the locking member 13 is assembled, and is slidable in the up and down directions.

The releasing member 14 further has a driving slope 141 inclined relative to the up and down movement directions of the releasing member 14. The releasing member 14 drives the locking member 13 to disengage from the engaging part 121 by means of the driving slope 141, so that, by means of the driving slope 141, the releasing member 14 more reliably drives the locking member 13 to exit from the engaging part 121 and to disengage from the engaging part 121. In some embodiments, the releasing member 14 is provided with a first slot opening 14*a* inclined relative to the up and down movement directions of the releasing member 14, and a side wall of the first slot opening 14*a* forms the driving slope 141. The locking member 13 is arranged to be inserted into the first slot opening 14*a*. The purpose of such an arrangement is to ensure that the linkage between the releasing member 14 and the locking member 13 is more reliable. In FIG. 7, in order to enable the releasing member 14 to be linked with the locking member 13 more smoothly, a guiding groove 111 is disposed in the supporting body 11 in which the locking member 13 is assembled, and the guiding groove 111 is configured to guide the locking member 13 when the locking member 13 is driven by the releasing member 14 to disengage from the engaging part 121. The locking member 13 is further configured to be inserted into the guiding groove 111. Therefore, when the releasing member 14 sliding upwards, the releasing member 14 drives the locking member 13 to disengage from the locking engaging part 121 along the guiding groove 111, thereby achieving the purpose of disengaging the locking member 13 from the engaging part 121. It may be understood that, in other embodiments, the locking member 13 may be movably assembled on the movable body 12, and correspondingly, the engaging part 121 is arranged on the supporting body 11, which may also realize the purpose of locking the locking member 13 between the movable body 12 and the supporting body 11 and the purpose of height adjustment. In addition, the number of the engaging part 121 may also be one, two, four or five, etc. When the number of engaging part 121 is one, the height of the playpen support 40 cannot be adjusted.

As shown in FIG. 7, FIG. 9, and FIG. 10, the unfolding and folding mechanism 10 further includes an elastic resetting and releasing member 15. The elastic resetting member 15 is arranged inside the supporting body 11, and the elastic resetting member 15 always intends to force the releasing member 14 to drive the locking member 13 and the engaging part 121 to engage with each other, so that the locking member 13 may engage with the engaging part 121 faster and more reliable, thus facilitating automatic resetting of the releasing member 14. For example, the elastic resetting member 15 is a spring, such as but not limited to a compression spring shown in FIG. 7, FIG. 9 or FIG. 10. It may be understood that the elastic resetting member 15 may also be arranged in the movable body 12 according to actual requirements.

As shown in FIG. 10, the movable body 12 includes an elastic damping member 12*a*, and an upper movable body 12*b* and a lower movable body 12*c* that are telescopic and slidable relative to each other in the up and down directions. The lower movable body 12*c* is pivotally connected to the first connecting bar 30*a* and the second connecting bar 30*b* respectively, so that the second pivot point P2 is formed at the position where the lower movable body 12*c*, the first connecting bar 30*a* and the second connecting bar 30*b* are pivotally connected. The elastic shock proof member 12*a* is arranged between the upper movable body 12*b* and the lower movable body 12*c*. Such an arrangement makes the stroller frame 100 of the present disclosure have a better damping vibration effect. For example, the elastic shock proof member 12a is a spring, such as but is not limited to the compression spring shown in FIG. 10.

Figure 11:
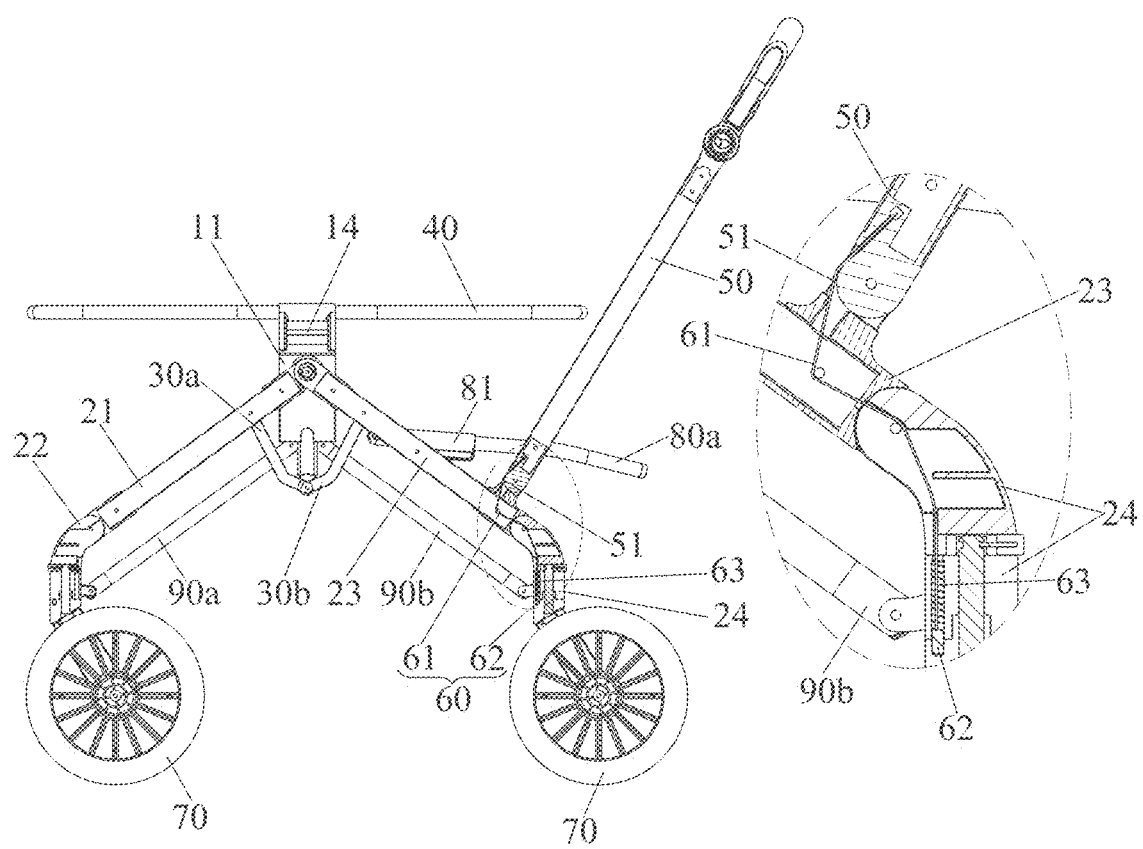
FIG. 11 is a schematic view showing the internal structure of the stroller frame shown in FIG. 1 after the stroller frame is cut by a plane passing through an orientation mechanism of a wheel and perpendicular to left and right directions.
Figure 12:
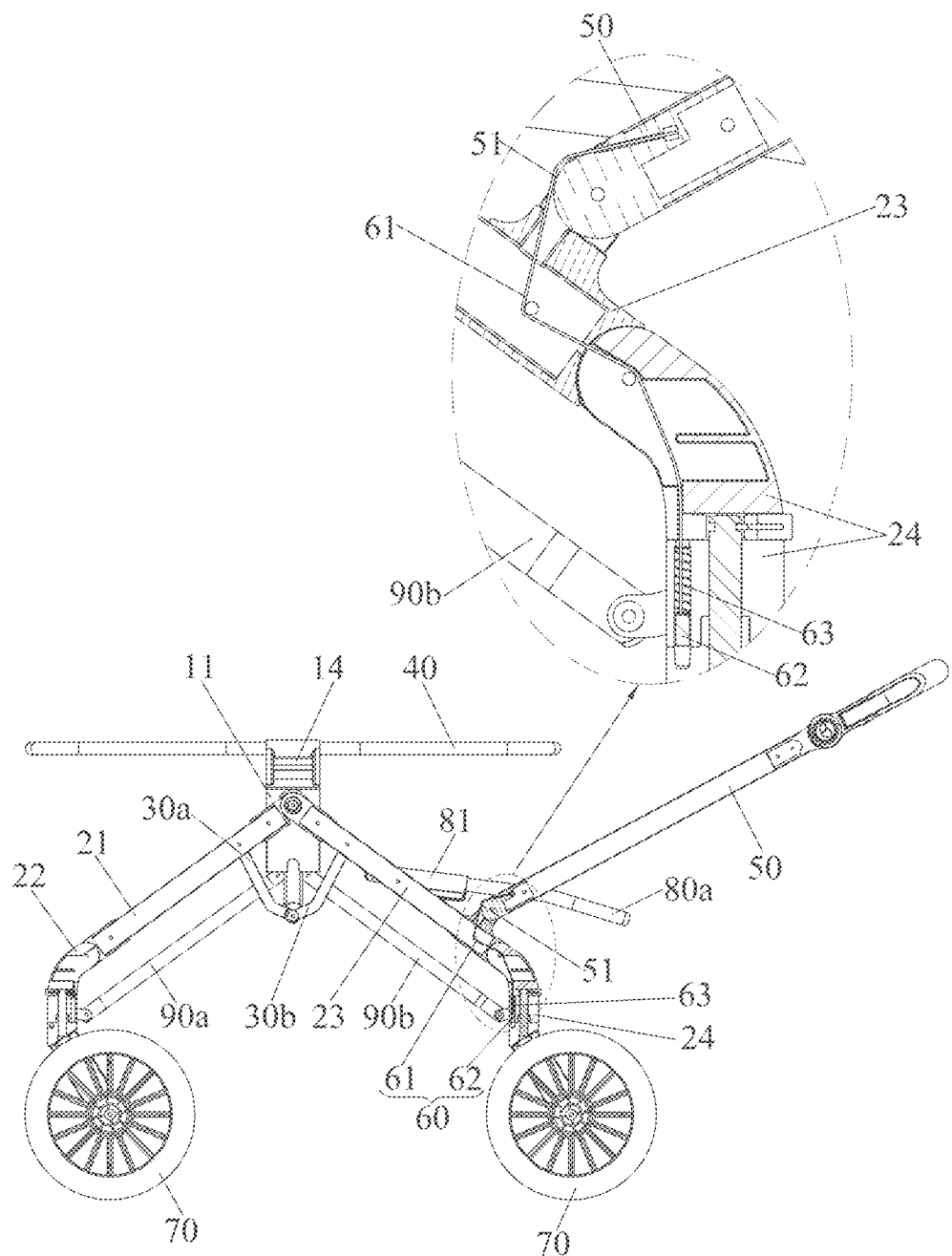
FIG. 12 is a schematic view showing the internal structure of the stroller frame shown in FIG. 2 after the stroller frame is cut by a plane passing through the orientation mechanism of the wheel and perpendicular to the left and right directions.

As shown in FIGS. 1 to 5 and FIGS. 10 to 15, the stroller frame 100 of the present disclosure further includes a handle 50. The handle 50 is pivotally connected to the rear foot support 20b, so that a fifth pivot point P5 is formed at a position where the handle 50 and the rear foot support 20b are pivotally connected. The handle 50 may be switched between a position of pushing the stroller shown in FIG. 1, FIG. 3, FIG. 4, FIG. 13 or FIG. 14 and a position of pulling the stroller shown in FIG. 2, so that the usage modes of the stroller frame 100 of the present disclosure are more flexible. It will be understood that, the handle 50 is not limited to such an arrangement, and in other embodiments, the handle 50 may also be pivotally connected to the front foot support 20a. Specifically, in FIGS. 11 and 12, the stroller frame 100 of the present disclosure also includes a wheel orientation mechanism 60 linked with the handle 50, the front foot support 20a and the rear foot support 20b each are provided with a wheel 70. The wheel orientation mechanism 60 is assembled on the rear foot support 20b. When the handle 50 is switched to the position of pushing the stroller as shown in FIG. 11, the handle 50 drives the wheel orientation mechanism 60 so as to lock the wheel 70 arranged on the rear foot support 20b, and the state is shown in FIG. 11. When the handle 50 is switched to the position of pulling the stroller as shown in FIG. 12, the wheel orientation mechanism 60 is driven to release the wheel 70 arranged on the rear foot support 20b, and the state is shown in FIG. 12. The specific structure of the wheel orientation mechanism 60 is as follows.

As shown in FIGS. 11 and 12, the wheel orientation mechanism 60 includes a flexible traction member 61, an orientation member 62 and an orientation elastic resetting member 63. The traction member 61 is arranged inside the handle 50 and inside the rear foot support 20b pivotally connected to the handle 50, so as to hide the traction member 61. A first end of the traction member 61 is assembled on the handle 50, and a second end of the traction member 61 is assembled on the orientation member 62. The orientation member 62 is movably assembled inside the rear foot support 20b. In some embodiments, the orientation member 62 may be assembled, but not limited to, inside the rear foot support 20b and slidably in the up and down directions. The orientation elastic resetting member 63 is arranged on the orientation member 62 and in the rear foot support 20b pivotally connected to the handle 50, and the orientation elastic resetting member 63 always intends to force the orientation member 62 to move to engage with the wheel 70 on the rear foot support 20b. Therefore, when switching the handle 50 to the position of pulling the stroller, the orientation member 62 is lifted to release the wheel 70 by means of the traction member 61, and the state is shown in FIG. 12. When switching the handle 50 to the position of pushing the stroller, the orientation member 62 is lowered to lock the wheel 70 by means of the traction member 61, and the state is shown in FIG. 11. Specifically, the handle 50 has a cam-profiled structure 51, and the part of the traction member 61 between the first end and the second end is arranged around the cam-profiled structure 51. Therefore, when switching the handle 50 between the position of pushing the stroller and the position of pulling the stroller, the orientation member 62 is correspondingly lowered or lifted by means of the cam-profiled structure 51, so that the orientation operation on the wheel 70 is easier and more convenient. For example, the traction member 61 is but not limited to a rope, or an iron wire, etc. The orientation elastic resetting member 63 is a spring, such as but not limited to the compression spring shown in FIG. 11 or FIG. 12.

Figure 13:
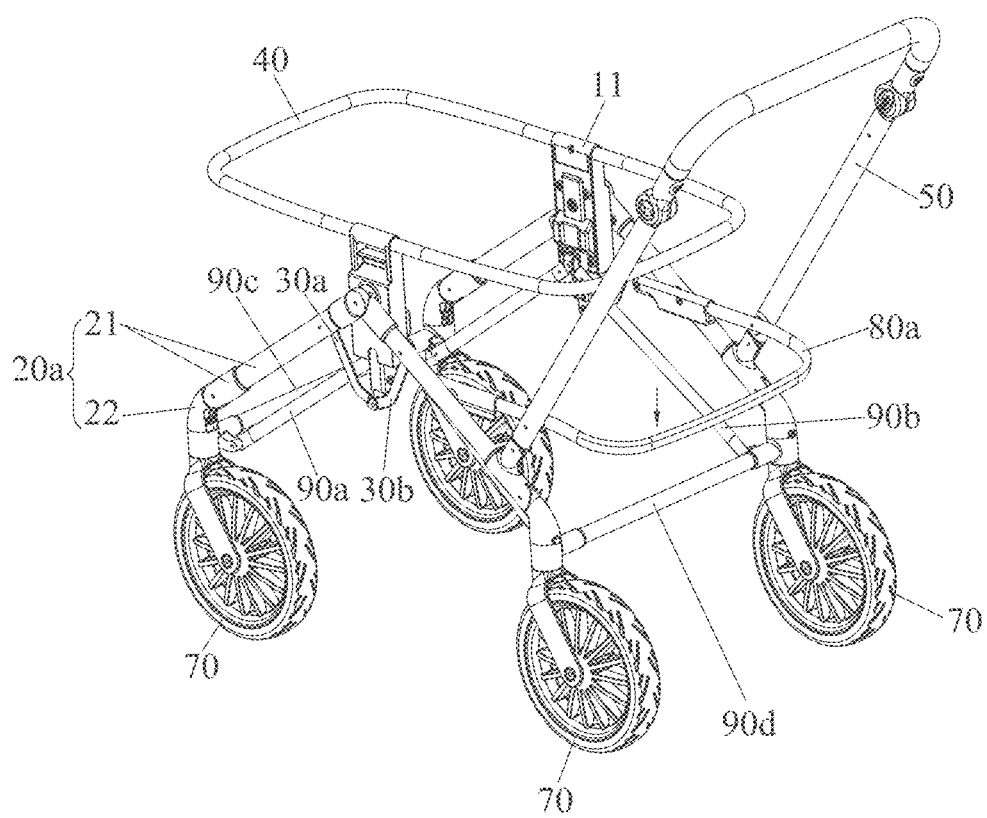
FIG. 13 is a schematic three-dimensional structural view showing the stroller frame shown in FIG. 3 from another angle of view.
Figure 14:
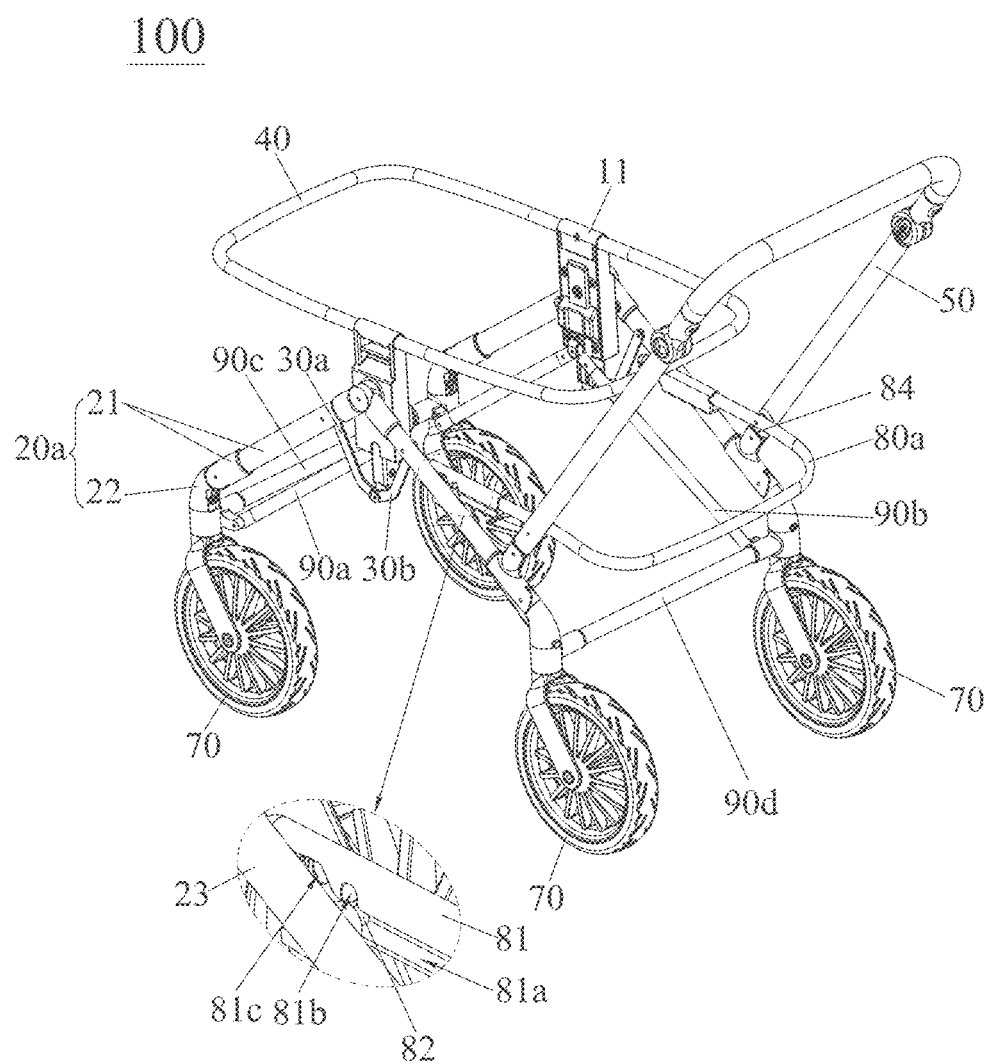
FIG. 14 is a schematic three-dimensional structural view of the stroller frame shown in FIG. 13 when a tubular member is pressed down to disengage a locking member from a first locking part.
Figure 15:
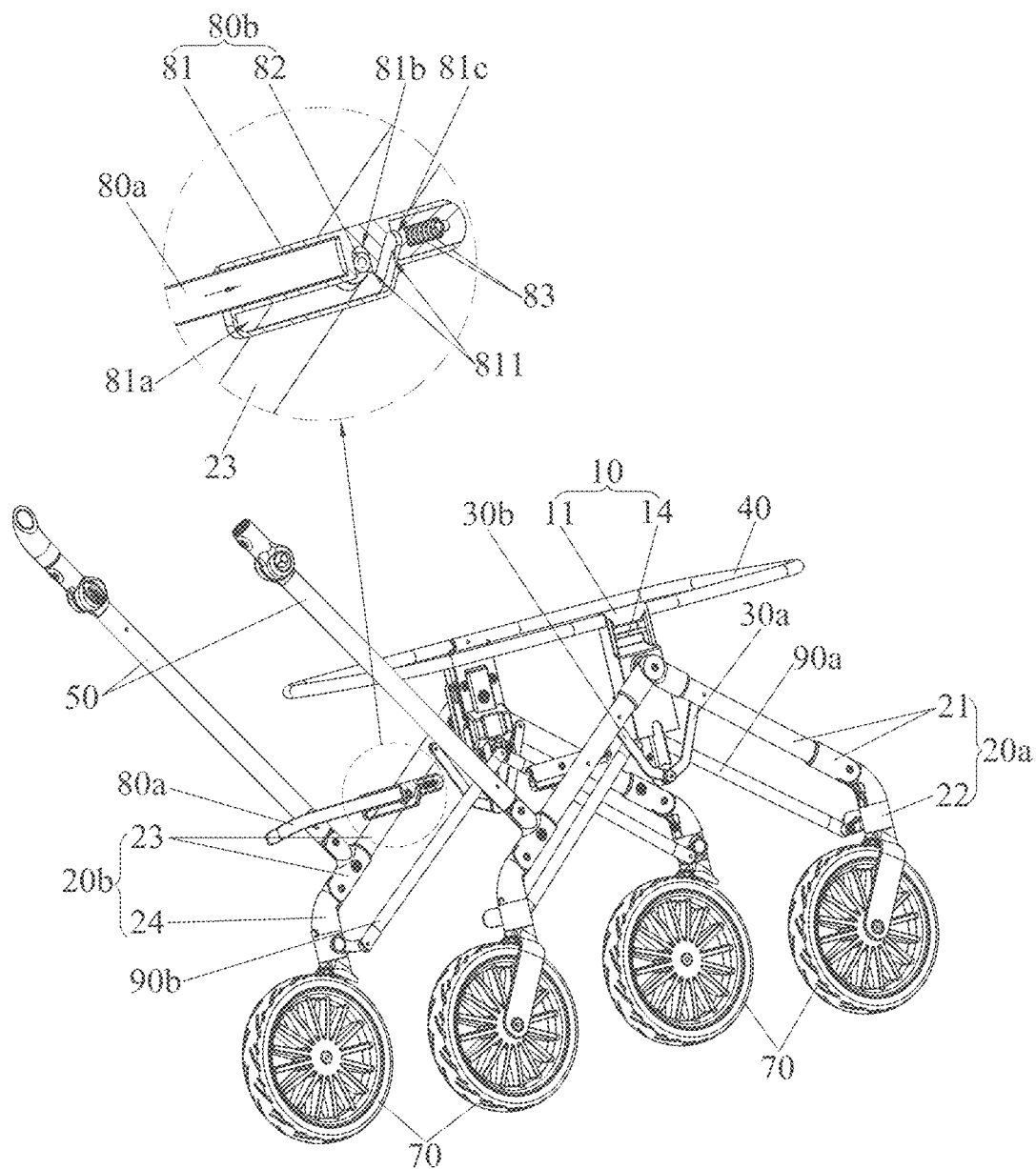
FIG. 15 is a schematic view showing the internal structure of the stroller frame shown in FIG. 13 after the stroller frame is cut at a suspension mechanism thereof.

As shown in FIGS. 13-15, in order to ensure that the handle 50 at the position of pushing the stroller or the position of pulling the stroller to be kept in the corresponding state, the stroller frame 100 of the present disclosure further includes a tubular member 80a pivotally connected to the handle 50, and a suspension mechanism 80b configured to keep the handle 50 at the position of pushing the stroller or at the position of pulling the stroller. The suspension mechanism 80b is assembled on the tubular member 80 and to the rear foot support 20b. Specifically, the suspension mechanism 80b includes a sliding member 81 slidably arranged on the tubular member 80a, a locked member 82 arranged on the rear foot support 20b pivotally connected to the handle 50, and an elastic retainer 83a arranged between the sliding member 81 and the tubular member 80a. The sliding member 81 is provided with a second slot opening 81a extending along a sliding direction of the sliding member 81 (that is a direction indicated by an arrow in the tubular member 80a in FIG. 15 and an opposite direction thereof, which is also a length direction of the tubular member 80a), a first locking part 81b and a second locking part 81c which are in communication with the second slot opening 81a. The locked member 82 is arranged to be inserted into the second slot opening 81a. When switching the stroller frame 100 of the present disclosure between the unfolded position and the folded position, the locked member 82 slides along the second slot opening 81a. The locked member 82 slides into the first locking part 81b when the handle 50 is in the position of pushing the stroller, and the state is shown in FIG. 15. The locked member 82 slides into the second locking part 81c when the handle 50 is in the position of pulling the stroller. For example, the first locking part 81b and the second locking part 81c each are a notch 811 opening to the second slot opening 81a, which makes it easier for the locked member 82 when sliding along the second slot opening 81a, to enter the first locking part 81b or the second locking part 81c. The elastic retainer 83 always intends to force the sliding member 81 to slide along the length direction of the tubular member 80a, so as to force the locked member 82 to engage with the first locking part 81b or the second locking part 81c. In order to facilitate the resetting of the pivot movement of the tubular member 80a, a torsion spring 84 is provided at the pivot point where the tubular member 80a and the handle 50 are pivotally connected, to always force the rear end of the tubular member 80a to pivot upward. It should be noted that the slot opening refers to a general designation of a slot or an opening, and the sliding member 81 is but not limited to a slidable sleeve structure. In addition, the elastic retainer 83 may not be provided according to actual requirements. When the handle 50 is pivotally connected to the front foot support 20a, the locked member 82 is installed on the front foot support 20a where the handle 50 is pivotally connected.

Figure 1:
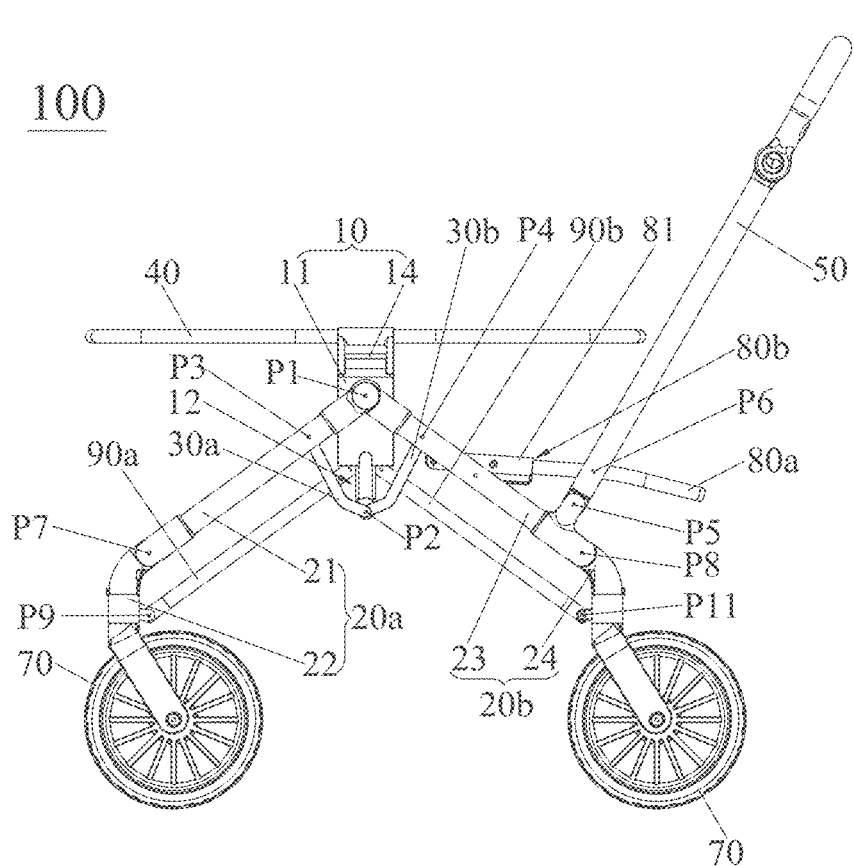
FIG. 1 is a schematic plane structural view showing a stroller frame in an unfolded position and a handle in a position of pushing the stroller according to the present disclosure.
Figure 2:
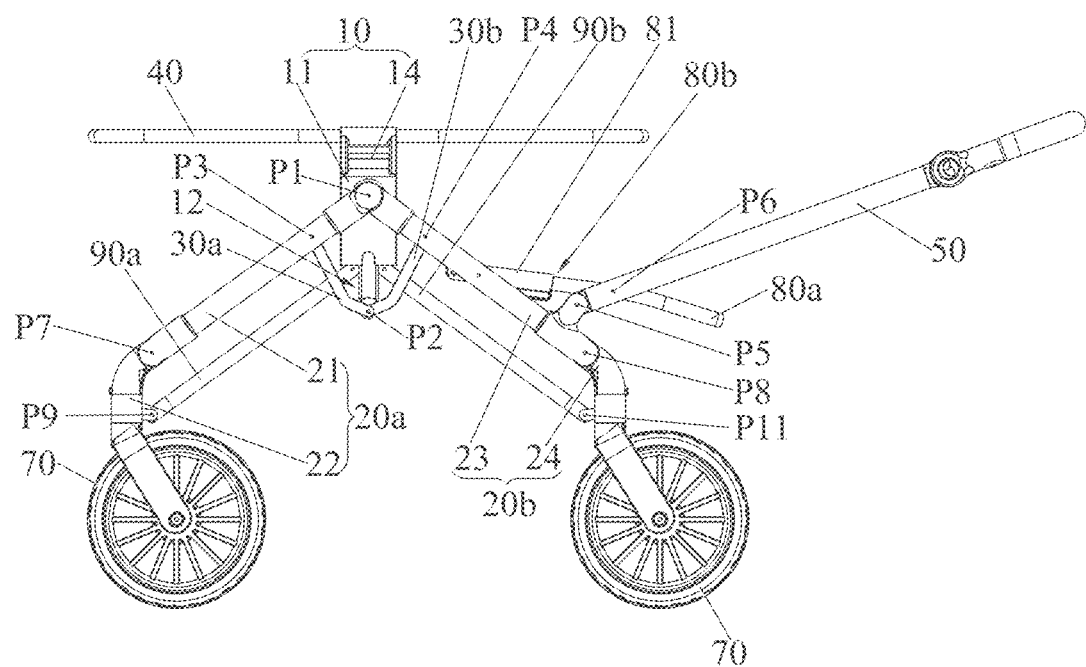
FIG. 2 is a schematic plane structural view showing the stroller frame in the unfolded position and the handle in a position of pulling the stroller according to the present disclosure.

As shown in FIGS. 1 to 3, in order to enable the stroller frame 100 of the present disclosure to stand on the ground reliably and to walk along the ground when the stroller frame 100 is in the folded position, the stroller frame 100 of the present disclosure further includes a third connecting bar 90a, a fourth connecting bar 90b, a front intermediate connecting bar 90c, and a rear intermediate connecting bar 90d. The third connecting bar 90a, the fourth connecting bar 90b, the front foot support 20a, the rear foot support 20b, the unfolding and folding mechanism 10, the first connecting bar 30a, and the second connecting bar 30b each are arranged at the left side and at the right side, namely, the left and the right sides of the stroller frame 100 of the present disclosure each are provided with one third connecting bar 90*a*, one fourth connecting bar 90*b*, one front foot support 20*a*, one rear foot support 20*b*, one unfolding and folding mechanism 10, one first connecting bar 30*a*, and one second connecting bar 30*b*. The front foot support 20*a* includes a front straight leg 21 and a front bent leg 22 pivotally connected to the front straight leg 21, so that a seventh pivot point P7 is formed at the position where the front bent leg 22 and the front straight leg 21 are pivotally connected to each other. The rear foot support 20*b* includes a rear straight leg 23 and the rear bent leg 24 pivotally connected to the rear straight leg 23, so that an eighth pivot point P8 is formed at the position where the rear bent leg 24 and the rear straight leg 23 are pivotally connected to each other. The supporting body 11 is pivotally connected to the front straight leg 21 and the rear straight leg 23 respectively, so that the first pivot point P1 is formed at the position where the supporting body 11, the front straight leg 21 and the rear straight leg 23 are pivotally connected to each other. The left and right ends of the front intermediate connecting bar 90*c* each are assembled and connected to a corresponding front bent leg 22 disposed at the same end, and the left and right ends of the rear intermediate connecting bar 90*d* each are assembled and connected to the corresponding rear bent leg 24 disposed at the same end. The third connecting bar 90*a* is pivotally connected to the movable body 12 and the front bent leg 22 at the same side, respectively, so that a ninth pivot point P9 is formed at the position where the third connecting bar 90*a* and the front bent leg 22 are pivotally connected to each other, and a tenth pivot point P10 is formed at the position where the third connecting bar 90*a* and the movable body 12 are pivotally connected to each other. The fourth connecting bar 90*b* is pivotally connected to the movable body 12 and the rear bent leg 24 at the same side, respectively, so that an eleventh pivot point P11 is formed at the position where the fourth connecting bar 90*b* is pivotally connected to the rear bent leg 24, and a twelfth pivot point P12 is formed at the position where the fourth connecting bar 90*b* is pivotally connected to the movable body 12. In such an arrangement, the front foot support 20*a*, the third connecting bar 90*a* and the unfolding and folding mechanism 10 together constitute a four-bar mechanism; and the rear foot support 20*b*, the fourth connecting bar 90*b* and the unfolding and folding mechanism 10 also together constitute a four-bar mechanism, so that the unfolding and folding operations of the stroller frame 100 of the present disclosure are smoother, and the structure of the folded stroller frame 100 is more compact, and the state is shown in FIG. 5. As shown in FIG. 5, since the stroller frame 100 of the present disclosure is in the folded position, correspondingly, the wheel 70 on the front foot support 20*a* and the wheel 70 on the rear foot support 20*b* pivot toward each other, so that the stroller frame 100 of the present disclosure may stand on the ground more stably by means of the wheels 70. It should be understood that, in the case that the front foot support 20*a* includes the front straight leg 21 and the front bent leg 22, the wheel 70 on the front foot support 20*a* is installed to the front bent leg 22. In the case that the rear foot support 20*b* includes the rear straight leg 23 and the rear bent leg 24, the orientation member 62 of the wheel orientation mechanism 60 is movably assembled on the rear bent leg 24, and the wheel on the rear foot support 20*b* is installed to the rear bent leg 24.

With reference to the drawings, the unfolding and folding processes of the stroller frame of the present disclosure will be described as follows. When the stroller frame 100 in the unfolded position shown in FIG. 3 is to be folded into the state shown in FIG. 5, an operator applies an upward force to the releasing member 14, and by means of the driving slope 141, the releasing member 14 drives the locking member 13 to disengage from the engaging part 121, so as to allow the movable body 12 to move relative to the supporting body 11, while the elastic resetting member 15 generates an elastic deformation to provide an elastic restoring force for the releasing of the releasing member 14. At this time, while the front foot support 20*a* and the rear foot support 20*b* are pivoting upward and away from each other, the first connecting bar 30*a* and the second connecting bar 30*b* are driven to pivot away from each other along with the movable body 12 approaching the supporting body 11. Then, the handle 50 pivots forward and is folded, thus surrounding the playpen support 40. The playpen support 40 moves up and down when switching the stroller frame 100 of the present disclosure between the unfolded position and the folded position, thus realizing the folding of the stroller frame 100, and the state is shown in FIG. 5. When the stroller frame 100 in the folded position shown in FIG. 5 is to be unfolded into the state shown in FIG. 3, the unfolding process is opposite to the folding process described above, and will not be described herein repeatedly. When the stroller frame 100 of the present disclosure is in the unfolded position, and when the playpen support 40 shown in FIG. 10 is to be adjusted to the height shown in FIG. 3, the locking member 13 first is disengaged from a top-most engaging part 121 by means of the releasing member 14, and then the front foot support 20*a* and the rear foot support 20*b* are forced to pivot upward and away from each other, so that the locking member 13 is aligned with an intermediate engaging part 121. At this time, release the releasing member 14, and under the action of the elastic resetting member 15, the releasing member 14 automatically drives the locked member 12 linked therewith to engage with the intermediate engaging part 121, and the state is shown in FIG. 4. In addition, when the stroller frame 100 of the present disclosure is in the unfolded position, and when the handle 50 in the position of pushing the stroller shown in FIG. 13 is to be switched to the position of pulling the stroller shown in FIG. 12, the rear end of the tubular member 80*a* is pressed down hard at this time, thus forcing the front end of the tubular member 80*a* to tilt upwards around the sixth pivot point P6, so that the first locking part 81*b* of the sliding member 81 disengage from the locked member 82 and slides along the second slot opening 81*a*. When the handle 50 is switched to the position of pulling the stroller, the locked member 82 enters the second locking part 81*c*, thereby locking the handle 50 in this state.

Compared with the prior art, the unfolding and folding mechanism 10 includes the supporting body 11, and the movable body 12 movably relative to the supporting body 11. The front foot support 20*a* is pivotally connected to the supporting body 11, and the rear foot support 20*b* is pivotally connected to the supporting body 11. The rear foot support 20*b* and the front foot support 20*a* may pivot therebetween, the first connecting bar 30*a* is pivotally connected to the front foot support 20*a* and the movable body 12 respectively, and the second connecting bar 30*b* is pivotally connected to the rear foot support 20*b* and the movable body 12 respectively, and the second connecting bar 30*b* and the first connecting bar 30*a* may pivot therebetween. Therefore, when switching the stroller frame 100 from the unfolded position to the folded position, and while the front foot support 20*a* and the rear foot support 20*b* are pivoting therebetween, they drive the first connecting bar 30*a* and the second connecting bar 30*b* to pivot along with the movable body 12 moving relative to the supporting body 11, thereby realizing the folding of the stroller frame 100, and facilitating the unfolding and folding operations of the stroller frame 100 of the present disclosure, and making the space occupied by the folded stroller frame 100 small.

What disclosed above are only preferred embodiments of the present disclosure. It will be noted that, the scope of the present disclosure cannot be limited to the embodiments. Therefore, equivalent variations made according to the scope of the present application still fall within the scope of the present disclosure.

What is claimed is:

1. A stroller frame, switchable between an unfolded position and a folded position, and comprising:
   an unfolding and folding mechanism, comprising a supporting body and a movable body movable relative to the supporting body;
   a front foot support, pivotally connected to the supporting body;
   a rear foot support, pivotally connected to the supporting body, the rear foot support pivotable relative to the front foot support;
   a first connecting bar, pivotally connected to the front foot support and the movable body, respectively;
   a second connecting bar, pivotally connected to the rear foot support and the movable body, respectively, the second connecting bar pivotable relative to the first connecting bar.

2. The stroller frame according to claim 1, wherein the movable body is arranged in the supporting body and slidable in up and down directions;
   the front foot support, the rear foot support and the supporting body are pivotally and coaxially connected; and
   the movable body, the first connecting bar and the second connecting bar are pivotally and coaxially connected.

3. The stroller frame according to claim 1, wherein:
   the unfolding and folding mechanism further comprises a locking member movably assembled on one of the supporting body and the movable body;
   another of the supporting body and the movable body is provided with an engaging part for engaging with the locking member; and
   the locking member is configured to stop the movable body from moving relative to the supporting body when engaging with the engaging part.

4. The stroller frame according to claim 3, wherein:
   a plurality of engaging parts are provided;
   the plurality of engaging parts are arranged at intervals in up and down directions;
   the engaging part is a hole or a groove.

5. The stroller frame according to claim 3, wherein:
   the unfolding and folding mechanism further comprises a releasing member linked with the locking member;
   the releasing member is configured to disengage the locking member from the engaging part, so that the movable body is movable relative to the supporting body.

6. The stroller frame according to claim 5, wherein:
   the releasing member is assembled on the supporting body or the movable body where the locking member is assembled, and is slidable in up and down directions;
   the releasing member further has a driving slope inclined relative to up and down movement directions of the releasing member; and
   the releasing member is configured to drive the locking member to disengage from the engaging part by means of the driving slope.

7. The stroller frame according to claim 5, wherein:
   the releasing member is provided with a first slot opening inclined relative to the up and down movement directions of the releasing member;
   the locking member is arranged to be inserted into the first slot opening; and
   a side wall of the first slot opening forms the driving slope.

8. The stroller frame according to claim 5, wherein:
   a guiding groove is disposed on the supporting body or the movable body where the locking member is assembled, and the guiding groove is configured to guide the locking member when the locking member is driven by the releasing member to disengage from the engaging part; and
   the locking member is configured to be inserted into the guiding groove.

9. The stroller frame according to claim 5, wherein:
   the unfolding and folding mechanism further comprises an elastic resetting member;
   the elastic resetting member is arranged inside the supporting body; and
   the elastic resetting member intends to force the releasing member to drive the locking member and the engaging part to engage with each other.

10. The stroller frame according to claim 3, wherein:
    the movable body comprises an elastic damping member, an upper movable body, and a lower movable body;
    the upper movable body and the lower movable body are telescopic relative to each other and slidable in up and down directions;
    the lower movable body is pivotally connected to the first connecting bar and the second connecting bar, respectively; and
    the elastic damping member is arranged between the upper movable body and the lower movable body.

11. The stroller frame according to claim 1, further comprising a playpen support assembled on the supporting body;
    the playpen support is in a shape of a ring.

12. The stroller frame according to claim 1, further comprising a handle, wherein the handle is pivotally connected to the rear foot support or the front foot support, and configured to be switchable between a position of pushing the stroller and a position of pulling the stroller.

13. The stroller frame according to claim 12, further comprising a wheel orientation mechanism linked with the handle; wherein:
    the front foot support and the rear foot support each are provided with a wheel;
    the wheel orientation mechanism is assembled on the rear foot support or the front foot support, to which the handle is pivotally connected; and
    when the handle is switched to the position of pushing the stroller, the handle is configured to drive the wheel orientation mechanism to lock the wheel arranged to the front foot support or the rear foot support, to which the handle is pivotally connected; and
    when the handle is switched to the position of pulling the stroller, the handle is configured to drive the wheel orientation mechanism to release the wheel arranged to the front foot support or the rear foot support, to which the handle is pivotally connected.

14. The stroller frame according to claim 13, wherein:
the wheel orientation mechanism comprises a flexible traction member, an orientation member and an orientation elastic resetting member;
the traction member is arranged inside the handle, and inside the front foot support or the rear foot support, to which the handle is pivotally connected;
a first end of the traction member is assembled on the handle, and a second end of the traction member is assembled on the orientation member;
the orientation member is movably assembled on the front foot support or the rear foot support, to which the handle is pivotally connected;
the orientation elastic resetting member is arranged on the orientation member, and the front foot support or the rear foot support, to which the handle is pivotally connected;
the orientation elastic resetting member intends to drive the orientation member to move to engage with the wheel;
when switching the handle to the position of pulling the stroller, the orientation member is lifted to release the wheel by the traction member; and
when switching the handle to the position of pushing the stroller, the orientation member is lowered to lock the wheel by the traction member.

15. The stroller frame according to claim 14, wherein:
the handle has a cam-profiled structure;
a part of the traction member between a first end and a second end of the traction member is arranged around the cam-profiled structure; and
when switching the handle between the position of pushing the stroller and the position of pulling the stroller, the cam-profiled structure is configured to correspondingly lower or lift the orientation member.

16. The stroller frame according to claim 12, further comprising a tubular member pivotally connected to the handle, and a suspension mechanism configured to keep the handle at the position of pushing the stroller or at the position of pulling the stroller, wherein the suspension mechanism is assembled on the handle, and to the front foot support or the rear foot support, to which the handle is pivotally connected.

17. The stroller frame according to claim 16, wherein the suspension mechanism comprises:
a sliding member, slidably arranged on the tubular member, and
a locked member, arranged on the front foot support or the rear foot support, to which the handle is pivotally connected;
the sliding member is provided with a second slot opening extending along a sliding direction of the sliding member, a first locking part and a second locking part which are in communication with the second slot opening;
the locked member is arranged to be inserted into the second slot opening;
when switching the stroller frame between the unfolded position and the folded position, the locked member is configured to slide along the second slot opening;
the locked member is configured to slide into the first locking part when the handle is in the position of pushing the stroller; and
the locked member is configured to slide into the second locking part when the handle is in the position of pulling the stroller.

18. The stroller frame according to claim 17, wherein the first locking part and the second locking part each are a notch to the second slot opening.

19. The stroller frame according to claim 17, wherein:
the suspension mechanism further comprises an elastic retainer arranged between the sliding member and the tubular member;
the elastic retainer intends to drive the sliding member to slide along a length direction of the tubular member to force the locked member to engage with the first locking part or the second locking part.

20. The stroller frame according to claim 1, further comprising a third connecting bar, a fourth connecting bar, a front intermediate connecting bar, and a rear intermediate connecting bar, wherein:
the third connecting bar, the fourth connecting bar, the front foot support, the rear foot support, the unfolding and folding mechanism, the first connecting bar, and the second connecting bar each are arranged at a left side and at a right side of the stroller frame;
the front foot support comprises a front straight leg and a front bent leg pivotally connected to the front straight leg;
the rear foot support comprises a rear straight leg and a rear bent leg pivotally connected to the rear straight leg;
the supporting body is pivotally connected to the front straight leg and the rear straight leg, respectively;
left and right ends of the front intermediate connecting bar are respectively assembled on and connected to a corresponding front bent leg disposed;
left and right ends of the rear intermediate connecting bar each are respectively assembled on and connected to a corresponding rear bent leg;
the third connecting bar is pivotally connected to the movable body and the front bent leg, respectively; and
the fourth connecting bar is pivotally connected to the movable body and the rear bent leg, respectively.

* * * * *